United States Patent [19]

Sokolov et al.

[11] 4,246,019
[45] Jan. 20, 1981

[54] METHOD OF PRODUCING A COMPLEX MINERAL FERTILIZER

[76] Inventors: Igor D. Sokolov, Zanevsky prospekt, 32, kv. 200; Jury S. Safrygin, ulitsa Dekabristov, 29, kv. 36; Alexandr V. Muraviev, prospekt Kima, 4, kv. 210; Nina K. Andreeva, 2 Komsomolskaya utilsa, 57, korpus 1, kv. 22, all of Leningrad; Valery A. Zykov, Fortunatovskaya utilsa, 33/44, kv. 133, Moscow, all of U.S.S.R.

[21] Appl. No.: 13,150

[22] Filed: Feb. 21, 1979

[51] Int. Cl.³ .............................................. C05C 5/02
[52] U.S. Cl. .......................................... 71/59; 71/31; 423/170; 423/194; 423/395
[58] Field of Search .................... 71/31, 59, 60, 58; 423/395, 170, 162, 194, 551

[56] References Cited

U.S. PATENT DOCUMENTS

| 1,812,497 | 6/1931 | Ransom | 423/551 X |
| 1,946,068 | 2/1934 | Friedrich | 71/59 X |

FOREIGN PATENT DOCUMENTS 349823  6/1931  United Kingdom ........................ 71/59

Primary Examiner—Kenneth M. Schor
Attorney, Agent, or Firm—Lackenbach, Lilling & Siegel

[57] ABSTRACT

A method of producing a complex mineral fertilizer is disclosed, comprising the steps of decomposing polyhalite at a temperature not exceeding 110° C. in the presence of dilute nitric acid, neutralizing the obtained suspension with a substance selected from the group consisting of calcium carbonate, calcium hydroxide and calcium oxide, and separating the resultant product.

3 Claims, No Drawings

METHOD OF PRODUCING A COMPLEX MINERAL FERTILIZER

FIELD OF THE INVENTION

The present invention relates generally to the chemical processing of inorganic substances, and more specifically, to a method of producing a complex mineral fertilizer.

The complex mineral fertilizer provided by the present invention can be utilized to utmost advantage in agriculture for the purpose of fertilizing land areas where tuberous, vine, citrus and other farming plants are grown.

Gypsum, available as a by-product, may be used to gypsum the soil, as well as to produce construction materials.

BACKGROUND OF THE INVENTION

Since the time of the discovery of polyhalite ores and to the present known development efforts have been concentrated primarily on hydrothermic methods of processing polyhalite with the production of such fertilizers as potassium sulphate, sulphate of potash magnesia, syngenite. However, these prior art hydrothermic methods are based upon calcining polyhalite wherefrom sodium chloride has been washed out and followed by leaching a resultant bake with water and converting a resultant solution with potassium chloride. Other methods which comprise converting polyhalite wherefrom sodium chloride has not been washed out with potassium chloride at a temperature ranging from 800° to 850° C., ensure a low degree of recovery of useful components into the finished product, are complicated, power-consuming, require expensive facilities and presuppose the presence of alkaline effluents aggravating environmental pollution. For these reasons the aforementioned methods are not applicable commercially.

Recently there has been proposed a number of more advanced methods of processing polyhalite which afford the production of complex phosphatic-potassic (PP), nitrogen-phosphatic-potassic (NPK), nitrogen-phosphatic-potassic-magnesic (NPKMg) fertilizers. However, these prior art methods based upon decomposing polyhalite mixed with phosphate rock with the use of nitric acid and contemplating the production of molten or condensed potassium phosphates therefrom are technologically complicated, difficult to accomplish in terms of equipment design and do not permit recovery of ballast-free fertilizers.

Potassium phosphate is known to be a valuable fertilizer since it contains more than 70% of nutritive substances. Despite this fact, heretofore there has been developed no economically advantageous methods of producing it since potassium hydroxide and potassium carbonate utilized for the production of potassium phosphate are fairly costly products.

When employing a cheaper raw material, such as potassium chloride, a number of problems present themselves which are concerned with the utilization of the resulting secondary chlorine-containing products.

In the present state of the art there are known various methods of producing a complex mineral fertilizer by means of decomposing polyhalite in the presence of a mineral acid. According to one of such methods polyhalite is decomposed in the presence of sulfuric acid followed by separating gypsum and processing a solution comprised of potassium and magnesium sulphates and of sulfuric acid with sodium carbonate or potassium carbonate, subsequently separating the resultant magnesium carbonate, processing a mother liquor, i.e. the liquor obtained after the separation of magnesium carbonate, with ammonium carbonate or a mixture of ammonia and carbon dioxide, separating sodium bicarbonate and subsequently processing the liquor with phosphoric acid or hydrogen phosphate to produce a complex mineral fertilizer comprised of potassium and ammonium sulphates, ammonium phosphate, etc. The solution obtained after separating gypsum is processed with ammonium carbonate or a mixture of ammonia and carbon dioxide, separating the resultant magnesium carbonate and processing the mother liquor with phosphoric acid or hydrogen phosphate to produce a finished product.

A disadvantage of the prior art method described above consists in the multiplicity of stages and operating complexity. Furthermore, the content of ballast ions in the complex mineral fertilizer provided by this method is objectionably high (up to 50%).

Ballast components are chloride-ions and sulphate-ions which are not assimilated by the plants.

The most effective fertilizers are ballast-free, i.e. the type of fertilizers containing only substances (nitrogen, potassium oxide, phosphoric anhydride, magnesium oxide) fully assimilable by the plants.

In recent years expanded the production of ballast-free concentrated complex fertilizers comprised of two or three components has been a markedly general trend. However, current commercial methods for production of potassium nitrate and potassium phosphate are based upon the employment of potassium chloride and involve corrosion of the equipment, apart from generating a need for the utilization of the by-products containing chloride-ion or chlorine. It is therefore of particular interest for the production of ballast-free potassium fertilizers to make use of natural minerals which are not readily soluble in water, specifically, such minerals as natural polyhalite including potassium and magnesium in a ratio that is especially favorable in terms of assimilation by the plants. The present-day stocks of polyhalite ores available in the world for the production of chlorine-free fertilizers are ample. However, these stocks still remain dormant in view of the absence of any economically feasible technology.

Chlorine-free potassium fertilizers are known to be required for quite a variety of farming plants (vine, potatoes, citrus plants and others), on which chloride-ion has an inhibiting effect. The use of chlorine-free potassium fertilizers enables not only raising the yield of crops, but also improving the quality of farm products by virtue of an increase of starch content in potatoes, of sugar content in grapes and the like. These important considerations account for a steady world market demand for chlorine-free potassium fertilizers despite the fact that their cost as compared to that of potassium chloride is relatively high.

Moreover, the prior art methods of producing potassium sulphate, potassium nitrate or potassium phosphate based upon the use of potassium chloride involve corrosion of the equipment and a low degree of recovery of useful components.

The prior art also includes a number of other methods providing the production of potassium nitrate, e.g. by reacting potassium sulphate with magnesium nitrate, which so far have not gone beyond the scope of laboratory research.

The disadvantages inherent in the abovedescribed methods have been somewhat alleviated in another known method of producing a complex mineral fertilizer from polyhalite (see Pr. nauk Inst. technol. nieorgan. nawoz. mineral PWr 1973 No. 5, pp. 43–51). This method of producing a complex mineral fertilizer features the steps of decomposing polyhalite with the formation of a suspension, neutralizing said suspension and subsequently separating a resultant product. When practising the method, the step of decomposing polyhalite is conducted with the use of phosphoric acid at a temperature of 25° C., while that of subsequently neutralizing the resultant suspension is effected with the aid of a 25% ammonia solution, whereafter the product is subjected to drying at a temperature of 70° C. to produce a complex (nitrogen-phosphatic-potassic) fertilizer.

The NPK-fertilizer produced by this method has quite a few disadvantages manifesting themselves both in the fabrication of the fertilizer and in the application thereof.

In particular, the production of a ballast-free fertilizer is unattainable with this method inasmuch as calcium and sulphate-ions contained in polyhalite in amounts of up to 80% and qualified as ballast components are fully passed into the ultimate fertilizer, and the separation of said ballast components from the NPK-fertilizer during the course of polyhalite decomposition with phosphoric acid is technologically impracticable. Furthermore, the relatively low temperatures at which the decomposition of polyhalite is performed do not ensure an adequately high degree of recovery of useful components from the raw material processed.

The use of the NPK-fertilizer requires additional applications of potassium and nitrogen to the soil because the nutritives ratio thereof (up to 33.36% of $P_2O_5$, up to 13.6% of $K_2O$, up to 4.2% of N) has an adverse effect on the growth of the plants.

All of the phosphorus in the NPK-fertilizer produced by this prior art method is in the form of water-insoluble calcium and magnesium salts, and all of the potassium and nitrogen is in the form of readily soluble potassium and ammonium sulphates. When applying such a fertilizer to the soil the soluble components of the fertilizer are being washed out from the soil due to the difference in solubility of the salts contained therein. This leads to further impairment of the NPK-fertilizer nutritives ratio, which, does not favor the growth of plants and causes much difficulty in use.

SUMMARY OF THE INVENTION

Accordingly, one of the principal objects of the present invention is to provide a method of producing a complex mineral fertilizer, which obviates the aforestated disadvantages.

Another object of the present invention is to provide a method of producing a complex mineral fertilizer, which increase in the fertilizer the content of the components maximally assimilable by the plants and stimulatory to their growth.

Still another object of the present invention is to provide a method of producing a complex mineral fertilizer, which eliminates the ballast ions contained therein.

A further object of the present invention is to provide a method of producing a complex mineral fertilizer, which improves the degree of recovery of the useful components from the raw material processed.

A still further object of the present invention is to provide a complex mineral fertilizer, which augments the yield of the farm crops, as well as the quality thereof by virtue of the upgraded effectiveness of a ballast-free fertilizer.

With these and other objects in view, the present invention resides in a method of producing a complex mineral fertilizer from polyhalite comprising the steps of decomposing polyhalite with a mineral acid with the formation of a suspension, neutralizing said suspension and subsequently separating a resultant product, wherein according to the invention, the step of decomposing polyhalite is carried out at a temperature not exceeding 110° C. with dilute nitric acid, while the neutralizing of said suspension is effected with the use of a substance selected from the group consisting of calcium carbonate, calcium hydroxide and calcium oxide.

Practising the method of the invention so that the step of decomposing the crystals of polyhalite into sulphate ions, potassium and magnesium ions while separating calcium sulphate in a cold phase is carried out in the presence of dilute nitric acid, while that of neutralizing the resultant suspension is effected with the use of a substance selected from the group consisting of calcium carbonate, calcium hydroxide and calcium oxide. The inventive method makes it possible to produce a complex ballast-free fertilizer containing potassium, nitrogen, and magnesium, which is completely assimilated by the plants without causing negative agrochemical effects, and the ratio of nitrogen, potassium and magnesium of the obtained fertilizer is favorable for plant growth.

Moreover, this method provides for separation of the ballast components (ions of $Ca^2$ and $SO_4^{2-}$) from the fertilizer as a by-product in the form of gypsum which can be utilized in the manufacture of construction materials, as well as provide gypsum to the soil.

It is desirable that the step of decomposing polyhalite be carried out within a temperature range from 60° to 100° C.

Within the stated temperature range polyhalite is decomposed completely with the formation of potassium and magnesium sulphates, which secures the fullest recovery of the useful components from the raw material processed.

It is also desirable that the step of decomposing polyhalite be carried out with dilute nitric acid, its concentration being within the range from 5 to 25 weight percent.

The decomposing of polyhalite proves to be most effective within the abovementioned concentration range of nitric acid.

The foregoing and other objects as well as features of novelty of the present invention will be identified in the appended claims and the present invention will be made more readily understood on consideration of the ensuing detailed description of a number of preferred embodiments thereof.

DETAILED DESCRIPTION OF THE PREFERRED EMBODIMENTS OF THE INVENTION

The method of producing a complex mineral fertilizer in accordance with the present invention is practised as follows. Polyhalite, wherefrom sodium chloride has been washed out, is processed with nitric acid at a temperature not exceeding 110° C., preferably at a temperature from 60° to 100° C. for 0.5-2.5 hours. In order to neutralize the nitric acid a neutralizing agent (calcium carbonate, calcium hydroxide or calcium oxide) is introduced into the solution, the process of neutralization being conducted until a neutral solution (pH=6-7) is obtained. The gypsum deposited is separated and washed with water, the washings are returned to the decomposing stage together with a mother liquor, i.e. the liquor remaining after the separation of gypsum, the neutral solution is dehydrated, whereupon an ultimate product is obtained, i.e. the complex mineral fertilizer. The returning of a portion of the washing water to the decomposing stage is accomplished for the purpose of getting a higher degree of recovery of the useful components into the ultimate product.

Completeness of the decomposition of polyhalite is largely dependent upon the degree to which it has been decomposed and is defined as a ratio of the amount of potassium (magnesium) passing into the ultimate product to the amount of potassium (magnesium) contained in the starting product:

$$K=(G_1/G_2)\cdot 100\%,$$

where
K = degree of polyhalite decomposition;
$G_1$—weight of potassium (magnesium) passing into the ultimate product;
$G_2$—weight of potassium (magnesium) contained in the starting product.

A degree of polyhalite decomposition should always be equal to 100%, i.e. all of the potassium and magnesium included in polyhalite are to be fully converted to nitrates, otherwise an ultimate product, that is the complex mineral fertilizer in question, will contain calcium nitrate deteriorating the qualities thereof.

Completeness of the recovery is largely dependent upon the degree to which the useful components have been recovered in the ultimate product and is defined as a ratio of the amount of potassium (magnesium) that passed into the ultimate product to the amount of potassium (magnesium) contained in the starting product:

$$C=(q_1/q_2)\cdot 100\%,$$

where
C—degree of recovery of the useful components into the ultimate product;
$q_1$ = amount of potassium (magnesium) contained in the ultimate product;
$q_2$—amount of potassium (magnesium) contained in the starting product.

Below are given typical examples which are illustrative of some of the aspects of the present invention and clearly revealing the salient features and advantages thereof.

EXAMPLE I 40 kg. of polyhalite, wherefrom sodium chloride has been washed out, are placed in a heated reactor provided with a mixer and filled with 158.36 kg. of 11% nitric acid.

A resultant suspension was mixed at 60° C. for 120 minutes and then neutralized with the use of 8.44 kg. of unslaked lime to pH=5.5-6.0. The neutralization is carried out at 60° C. for 60 minutes in order to obtain large gypsum crystals. The neutralized suspension is filtered through a vacuum filter, the resultant gypsum is subjected to three-stage washing with 80 kg. of hot water, whereby 70.42 kg. of crude washed gypsum, 146.08 kg. of mother liquor and 67.63 kg. of washing water were obtained. The washed gypsum is discharged, and the mother liquor and washing water are dehydrated to produce 25.28 kg. of the ultimate product.

A degree of recovering potassium and magnesium amounts to 100%.

A degree of decomposing polyhalite amounts to 100%.

A material balance and chemical formulations of the starting materials, intermediate and ultimate products are presented in Table I.

TABLE 1

A material balance of the process and chemical formulations of the starting materials, intermediates and ultimate products

| | Weight in kg. | Salt composition (in percent) | | | | | | | | |
|---|---|---|---|---|---|---|---|---|---|---|
| | | $K_2SO_4$ | $MgSO_4$ | $CaSO_4$ | $MgCO_3$ | $MgCO_3$ | $HNO_3$ | $KNO_3$ | $Mg(NO_3)_2$ | $Ca(NO_3)_2$ |
| I. Income | | | | | | | | | | |
| 1. Polyhalite | 40.00 | 19.86 | 19.06 | 44.85 | 1.43 | — | — | — | — | — |
| 2. Diluted nitric acid | 158.36 | — | — | — | — | — | 11.0 | — | — | — |
| 3. Unslaked lime | 8.44 | — | — | — | — | — | — | — | — | — |
| 4. Water for washing | 80.00 | | | | | | | | | |
| Stage I | 40.00 | — | — | — | — | — | — | — | — | — |
| Stage II | 20.00 | — | — | — | — | — | — | — | — | — |
| Stage III | 20.00 | — | — | — | — | — | — | — | — | — |
| Total: | 286.80 | | | | | | | | | |
| II. Expenditure | | | | | | | | | | |
| 1. Mother liquor | 146.08 | — | — | 0.91 | — | — | — | 8.59 | 6.53 | 0.02 |
| 2. Washed gypsum | 70.42 | — | — | 50.91 | — | — | — | — | — | — |
| 3. Washing water resulting from stage I | 36.23 | — | — | 0.38 | — | — | — | 2.74 | 2.01 | — |
| 4. Washing water resulting from | | | | | | | | | | |

TABLE 1-continued

A material balance of the process and chemical formulations of the starting materials, intermediates and ultimate products

|   |   | | | | | | | | |
|---|---|---|---|---|---|---|---|---|---|
| | stage II | 14.70 | — | — | 0.28 | — | — | 0.96 | 0.73 | — |
| 5. | Washing water resulting from stage III | 16.70 | — | — | 0.23 | — | — | 0.34 | 0.24 | — |
| | Total: | 284.13 | | | | | | | | |
| 6. | Finished product | 25.28 | — | — | 3.93 | — | — | 54.31 | 41.24 | 0.11 |

| | | Weight in kg. | Salt composition (in percent) | | | | |
|---|---|---|---|---|---|---|---|
| | | | $H_2O$ | CaO | Insoluble residue | Impurity | Total |
| I. Income | | | | | | | |
| 1. | Polyhalite | 40.00 | 6.20 | — | 0.20 | — | 101.60 |
| 2. | Diluted nitric acid | 158.36 | 89.00 | — | — | — | 100.00 |
| 3. | Unslaked lime | 8.44 | — | 93.51 | — | 6.49 | 100.00 |
| | Water for washing | 80.00 | | | | | |
| | Stage I | 40.00 | 100.00 | — | — | — | 100.00 |
| | Stage II | 20.00 | 100.00 | — | — | — | 100.00 |
| | Stage III | 20.00 | 100.00 | — | — | — | 100.00 |
| | Total: | 286.80 | | | | | |
| II. Expenditure | | | | | | | |
| 1. | Mother liquor | 146.08 | 83.95 | — | — | — | 100.0 |
| 2. | Washed gypsum | 70.42 | 49.09 | 0.25 | 0.13 | | 100.38 |
| 3. | Washing water resulting from stage I | 36.23 | 94.87 | — | — | — | 100.00 |
| 4. | Washing water resulting from stage II | 14.70 | 98.03 | — | — | — | 100.00 |
| 5. | Washing water resulting from stage III | 16.70 | 99.19 | — | — | — | 100.0 |
| | Total: | 284.13 | | | | | |
| 6. | Finished product | 25.28 | 0.41 | — | — | — | 100.00 |

The complex mineral fertilizer produced by the proposed method contains magnesium, which makes it particularly attractive since the shortage of magnesis fertilizers is acute at the present time and will obviously be even more acute in the future.

As the evidence of the agrochemical investigations showed, the fertilizer, when applied to the turf-podzol soil, where potatoes were grown, proved to be promising and displayed a number of significant advantages both in the effect on the yield of potato tubers and in the gathering of starch per hectare.

EXAMPLE 2

60.00 kg of polyhalite ($K_2SO_4$—26.25%, $MgSO_4$—18.27% $CaSO_4$—43.66%, $MgCO_3$—0.06%, insoluble residue—5.21%, $H_2O$—7.49%), wherefrom sodium chloride has been washed out, are mixed in a heated reactor with 205.45 kg of a 11% nitric acid. A resultant suspension is mixed at 45° C. for 90 minutes and then neutralized with the use of 18.62 kg. of chalk ($CaCO_3$—97.75%) to pH=6.4. The neutralization is carried out at 60° C. for 60 minutes in order to obtain large gypsum crystals. The neutralized suspension is filtered, the gypsum is washed with 100.00 kg. of hot water. As a result, 96.51 kg. of crude washed gypsum ($CaSO_4.2H_2O$—62.12%, $KNO_3$—0.44%, $Mg(NO_3)_2$—0.31%, insoluble residue—3.24%, $H_2O$—33.89%), 182.34 kg. of mother liquor ($KNO_3$—9.09%, $Mg(NO_3)_2$—6.77%, $CaSO_4$—0.93%, $H_2O$—83.21%) and 93.89 kg. of washing water ($KNO_3$—1.37%, $Mg(NO_3)_2$—1.04%, $CaSO_4$—0.34%, $H_2O$—97.25%) were obtained. The washed gypsum and washing water are discharged, and the mother liquor is dehydrated to produce 31.06 kg. of the finished product ($KNO_3$—53.54% $Mg(NO_3)_2$—39.87%, $CaSO_4$—5.48%, $H_2O$—1.01%).

The degree of recovering potassium and magnesium into the product (with allowance made for the washing water) amounts to 98%, the degree of decomposing polyhalite amounts to 100%.

EXAMPLE 3

60.00 kg. of polyhalite ($K_2SO_4$—26.25%, $MgSO_4$—18.27%, $CaSO_4$—43.66%, $MgCO_3$—0.06%, insoluble residue—5.21%, $H_2O$—7.49% wherefrom sodium chloride has been washed out, of a fraction of $-1+0.5$ mm is mixed in a heated reactor with 205.45 kg. of 11% nitric acid. A resultant suspension is mixed at 90° C. for 60 minutes and then neutralized with the use of 13.47% kg. of calcium hydroxide to pH=6.0. The neutralization is carried out at 75° C. for 60 minutes in order to obtain large gypsum crystals. The neutralized suspension is filtered, the gypsum is washed with 100.00 kg. of water. As a result, 107.38 kg. of crude washed gypsum ($CaSO_4.2H_2O$—57.36%, $KNO_3$—0.62%, $Mg(NO_3)_2$—30.43%, insoluble residue—2.91%, $H_2O$—38.68%), 182.52 kg. of mother liquor ($KNO_3$—9.04%, $Mg(NO_3)_2$—6.65%, $CaSO_4$—0.84%, $H_2O$—83.47%), 88.12 kg. of washing water ($KNO_3$—1.48%, $Mg(NO_3)_2$—1.09%, $CaSO_4$—0.38% $H_2O$—97.05%) are obtained. The washed gypsum is discharged, and the mother liquor and washing water are dehydrated to produce 33.08 kg. of the finished product ($KNO_3$—53.61%, $Mg(NO_3)_2$—39.43%, $CaSO_4$—4.98%, $H_2O$—1.98%).

The degree of recovering potassium and magnesium into the product amounts to 96%, the degree of decomposing polyhalite amounts to 100%.

EXAMPLE 4

60.00 kg. of polyhalite ($K_2SO_4$—26.25%, $MgSO_4$—18,27%, $CaSO_4$—43.66%, $MgCO_3$—0.06%, insoluble residue—5.21%, $H_2O$—7.49%), wherefrom sodium chloride has been washed out, of a fraction of $-0.5+0.25$ mm is mixed in a heated reactor with 459.20 kg. of 5% nitric acid. A resultant suspension is mixed at 100° C. for 60 minutes and then neutralized with the use of 18.62 kg. of chalk ($CaCO_3$—97.75%) to pH=6.5. The neutralization is carried out at 60° C. for minutes in order to obtain large gypsum crystals. The neutralized suspension is filtered, the gypsum is washed with 40.00 kg. of hot water. As a result, 95.06 kg. of crude washed gypsum ($CaSO_4.2H_2O$—62.11%, insoluble residue—3.29%, $H_2O$—34.60%) 433.48 kg. of mother liquor ($KNO_3$—4.13%, $Mg(NO_3)_2$—3.08%, $CaSO_4$—0.45%, $H_2O$—92.34%) and 37.95 kg. of washing water ($KNO_3$—1.02%, $Mg(NO_3)_2$—0.64%, $CaSO_4$—0.82%; $H_2O$—97.57%) were obtained. The washed gypsum is discharged, and the mother liquor and washing water are dehydrated to produce 31.16 kg. of the finished product ($KNO_3$—53.60%, $Mg(NO_3)_2$—39.81%, $CaSO_4$—5.46%, $H_2O$—1.13%).

The degree of recovering potassium and magnesium into the product amounts to 96%, the degree of decomposing polyhalite amounts to 100%.

EXAMPLE 5

40.00 kg. of polyhalite ($K_2SO_4$—29.36%, $MgSO_4$—19.06%, $CaSO_4$—44.85%, $MgCO_3$—1.43%, insoluble residue—0.2%, $H_2O$—6.20%) wherefrom sodium chloride has been washed out, of a fraction of $-0.5+0.25$ mm is mixed in a heated reactor with 93.11 kg. of 19% nitric acid which previously was partly neutralized with 3.38 kg. of unslaked lime containing 93.51% of CaO. A resultant suspension is mixed at 90° C. for 120 minutes and neutralized with the use of 5.06 kg. of unslaked lime to pH=6.5. The neutralization is carried out at 80° C. for 45 minutes in order to obtain gypsum. The neutralized suspension is filtered, the gypsum is subjected to washing with 100 kg. of hot water. As a result, 72.14 kg. of crude washed gypsum ($CaSO_4.2H_2O$—64.44%, insoluble residue—0.13%, $H_2O$—35.43%), 84.44 kg. of mother liquor ($KNO_3$—14.86%, $Mg(NO_3)_2$—11.29%, $CaSO_4$—1.57%, $Ca(NO_3)_2$—0.003%, $H_2O$—72.75%), and 84.97 kg of washing water ($KNO_3$—1.48%, $Mg(NO_3)_2$—1.09%, $CaSO_4$—0.26%, $H_2O$—97.28%. The washed gypsum is discharged, and the mother liquor and washing water are dehydrated to produce 25.42 kg. of the finished product ($KNO_3$—54.29%, $Mg(NO_3)_2$—41.38%, $CaSO_4$—3.90%, $Ca(NO_3)_2$—0.14%, $H_2O$—0.29%).

The degree of decomposing polyhalite amounts to 100%. The degree of recovering potassium and magnesium into the product amounts to 99%.

EXAMPLE 6

60.00 kg. of dry polyhalite ($K_2SO_4$—26.25%, $MgSO_4$—18.27%, $CaSO_4$—43.66%, $MgCO_3$—0.06%, insoluble residue —5.21%, $H_2O$—7.49%, wherefrom sodium chloride has been washed out, is ground to a fineness of 0.25 mm and placed into a heated reactor provided with a mixer, and containing 132.94 kg. of 17% nitric acid. A resultant suspension is mixed at 70° C. for 120 minutes and neutralized with the use of 18.62 kg. of chalk ($CaCO_3$—99.96%) for 60 minutes in order to obtain large gypsum crystals. The gypsum deposit is separated using a vacuum filter and is washed with 100.00 kg of hot water. As a result, 118.02 kg. of mother liquor ($KNO_3$—14.04%, $Mg(NO_3)_2$—10.46%, $CaSO_4$—0.98%, $H_2O$—74.52% 96.00 kg. of gypsum washed from the mother liquor ($CaSO_4.2H_2O$—63.13%, $KNO_3$—0.43%, $Mg(NO_3)_2$—0.32%, $H_2O$—32.87%) and 97.54 kg. of washing water ($KNO_3$—1.32%, $Mg(NO_3)_2$—0.94%, $CaSO_4$—0.33%, $H_2O$—97.41%) are obtained. The washed gypsum is discharged, and the mother liquor and washing water are dehydrated to produce 33.04 kg. of the finished product ($KNO_3$—53.64%, $Mg(NO_3)_2$—39.42%, $CaSO_4$—4.90%, $H_2O$—1.95%).

The degree of recovering potassium and magnesium into the product amounts to 98%, the degree of decomposing polyhalite amounts to 100%.

EXAMPLE 7

100.00 kg. of dry polyhalite, wherefrom sodium chloride has been washed out, is ground to a fineness of $-0.5+0.25$ mm and placed into a heated reactor equipped with a mixer and containing 76.93 kg. of 55.4% nitric acid and 235.59 kg. of washing water. A resultant suspension is mixed at 90° C. for 150 minutes and then neutralized with the use of 33.24 kg. of chalk at 75° C. for 60 minutes. The gypsum deposit is separated using a vacuum filter, whereby 188.01 kg. of unwashed gypsum and 243.13 kg. of mother liquor (filtrate) are obtained. The gypsum while passing through the filter is washed with 250.46 kg. of hot water. As a result, 212.88 kg. of gypsum washed from the mother liquor and 235.59 kg. of washing water are obtained. The washed gypsum is discharged, the washing water is returned to the decomposing stage, and the mother liquor is dehydrated to produce 57.04 kg. of the product.

The degree of recovering potassium and magnesium into the product amounts to 95%, the degree of decomposing polyhalite amounts to 100%.

Chemical formulations of the starting materials, intermediate and ultimate products are presented in Table 2.

| Products | Consumption of products (kg) | $K_2SO_4$ | $MgSO_4$ | $CaSO_4$ | $KNO_3$ | $Mg(NO_3)_2$ | $CaCO_3$ | $HNO_3$ | Total $H_2O$ | Total |
|---|---|---|---|---|---|---|---|---|---|---|
| Polyhalite | 100.00 | 28.86 | 20.05 | 44.61 | — | — | — | — | 6.41 | 99.93 |
| $HKO_3$ | 76.93 | — | — | — | — | — | — | 54.4 | 45.60 | 100.00 |
| $CaCO_3$ | 33.24 | — | — | — | — | — | 99.96 | — | — | — |
| Gypsum (unwashed) | 188.01 | — | — | 47.53 | 5.26 | 3.90 | — | — | 43.30 | 99.99 |
| Mother leach | 243.13 | — | — | 0.55 | 13.10 | 9.64 | — | — | 76.71 | 100.00 |
| Gypsum (washed) | 202.88 | — | — | 43.56 | 0.83 | 0.61 | — | — | 54.91 | 99.91 |
| Washing water | 235.59 | — | — | 0.37 | 3.47 | 2.56 | — | — | 93.60 | 100.00 |
| Finished product | 57.04 | — | — | 2.36 | 55.81 | 41.06 | — | — | 0.77 | 100.00 |

Chemical formulations of the starting materials, intermediates and ultimate products. Consumption rates While describing by way of examples the foregoing various embodiments of the present invention, a specific set of narrow terms has been employed herein to provide better clarity. However, it is to be understood that the present invention is not in the least limited by the terms accepted in the specification and that every such term covers all equivalent elements accomplishing the same function and utilized for achieving the same objects.

Although the present invention has been disclosed hereinabove with descriptive reference being made to the preferred embodiments thereof, it is readily apparent to those skilled in the art that various unsubstantial changes and modifications can be introduced into the steps of the method of producing a complex mineral fertilizer without departing from the spirit of the invention.

All such changes and modifications are considered to be well within the spirit and scope of the invention defined in the appended claims.

What is claimed is:

1. In a method of producing a complex mineral fertilizer from polyhalite, comprising the steps of removing sodium chloride from said polyhalite decomposing polyhalite with a mineral acid to form a suspension, neutralizing said suspension, and separating the improvement in the neutralizing and decomposing steps which comprises employing nitric acid as said mineral acid and decomposing said polyhalite by heating to a temperature not exceeding 110° C., in the presence of dilute nitric acid, having a concentration varying from 5–25 weight percent acid, and neutralizing the suspension thereby formed with a substance selected from the group consisting of calcium carbonate, calcium hydroxide and calcium oxide.

2. A method of producing a complex mineral fertilizer according to claim 1, wherein the step of decomposing polyhalite is carried out at temperatures ranging from 60° to 100° C.

3. A method of producing a complex mineral fertilizer according to claim 2, wherein the decomposition is carried out for 0.5 to 2.5 hours.

* * * * *